Dec. 17, 1968  C. H. FLETCHER  3,417,001
PLURAL STAGE DISTILLATION PROCESS AND SYSTEM WITH FOAM CONTROL
Filed March 15, 1967
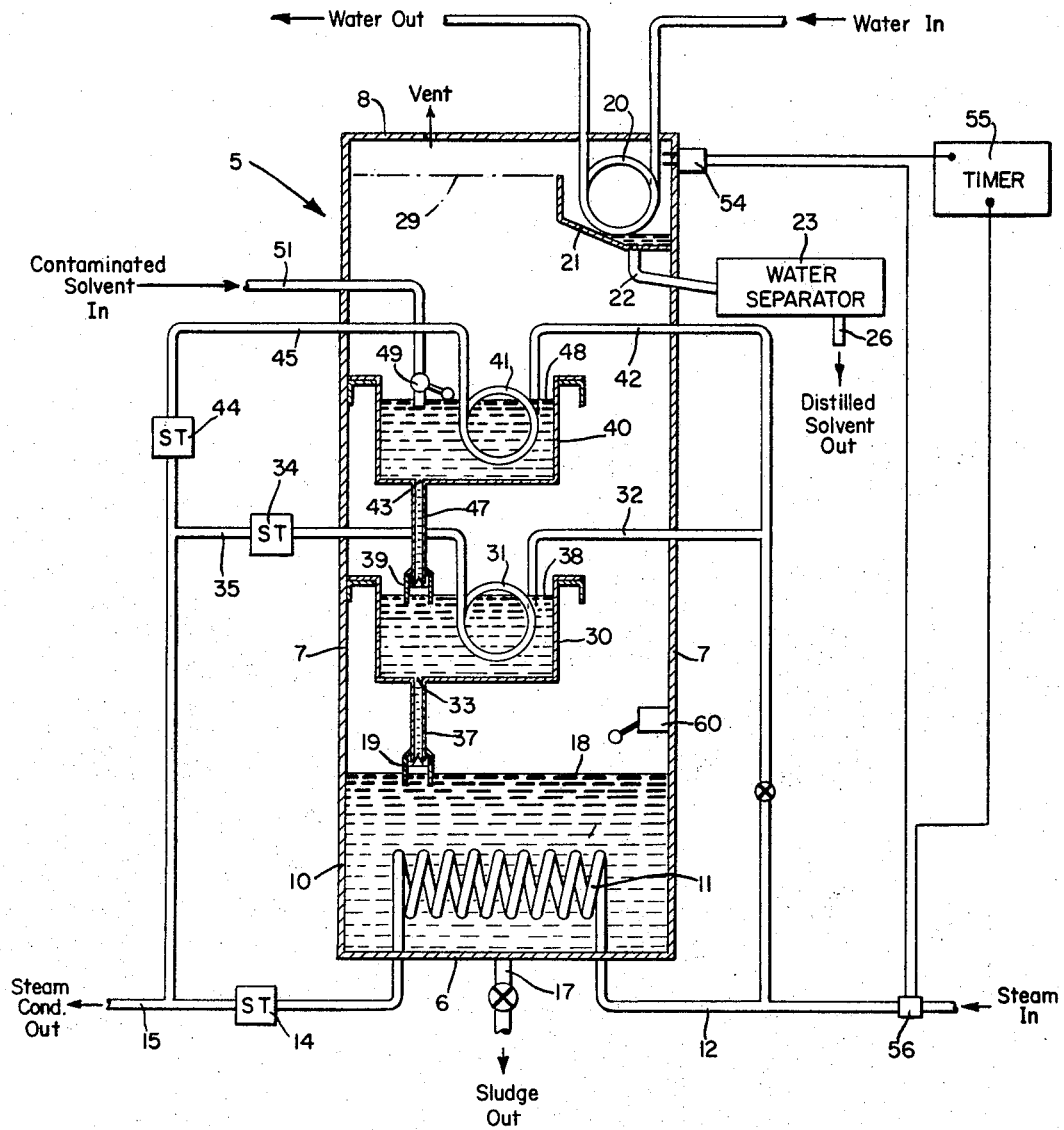
INVENTOR.
CALVERT HUGH FLETCHER
BY
Paul + Paul
ATTORNEYS.

United States Patent Office

3,417,001
Patented Dec. 17, 1968

3,417,001
PLURAL STAGE DISTILLATION PROCESS AND
SYSTEM WITH FOAM CONTROL
Calvert Hugh Fletcher, Bowling Green, Ky., assignor to
Detrex Chemical Industries, Inc., Detroit, Mich., a corporation of Michigan
Filed Mar. 15, 1967, Ser. No. 623,409
5 Claims. (Cl. 203—20)

ABSTRACT OF THE DISCLOSURE

A distillation system or still is disclosed having a multi-level evaporation system with continuously self-adjusting liquid level control and control of foaming. The system has particularly application to reclaim of solvent in dry cleaning systems. Two auxiliary evaporation pans are mounted, one above the other, within the vapor zone of the main boil chamber of the still, below the condenser. The contaminated solvent is fed to the upper auxiliary pan for partial evaporation. Liquid from the upper auxiliary pan is discharged to the lower auxiliary pan for further partial evaporation. Similarly, liquid from the lower auxiliary pan is discharged to the main boil chamber. Float control valves are provided to control the liquid level in each vessel. At start up, the main boil chamber fills first to the float-controlled level, the liquid passing through the two auxiliary pans. Next, the lower auxiliary pan, and finally the upper auxiliary pan, fills to the float-controlled level. When the still is operating at its maximum production rate, the liquid levels in the main boil chamber and in both auxiliary boil pans are automatically maintained at their float-control levels. Residue accumulates only in the main boil chamber. No residue collects in the auxiliary pans. The system permits distillation to be carried out at a high rate without encountering uncontrolled foaming.

BACKGROUND OF THE INVENTION

Field of the invention

This invention relates to a distillation process and apparatus particularly applicable for use in the distillation of dry-cleaning solvents, but also useful for other distillation purposes.

The processes ordinarily used in the dry-cleaning of garments removes not only solid soils but also soluble soils, fatty acids, body salts and colored dyes from the garments being cleaned and tends to hold these contaminants of the cleaning solvent. The usual method of separating the soluble soils from the cleaning solvent is by distillation. The soluble soils ordinarily encountered have a higher boiling point than the cleaning solvent (usually perchloroethylene) and accordingly it is the solvent which is vaporized in the still. The solvent vapors and moisture (water) are conducted to a condensing area, and the resultant condensate is collected and passed through a water separator to separte the reclaimed solvent from the water. The soluble soils are left in the boil chamber of the still as residue. These soils accumulate in the boil chamber and the boiling point of the mixture of solvent and residue rises until it is undesirably high, with resultant reduction in the distillation rate. To correct the condition, the residues are drained, from time to time, from the boil chamber.

To aid in the dry-cleaning process, it has become customary to use solvent soluble soaps and to introduce a small controlled amount of moisture into the solvent. However, the use of these aids increases the problems of distillation because the soap and moisture which are introduced in the boil chamber along with the solvent tend to interact with and emulsify the oily residues of the distillation and foaming results. When foaming occurs, the dirty solvent (that is the solvent containing the residues) is carried by the foam up into the condensing area and from there may be returned to the solvent storage tank. This, of course, must be avoided, and consequently it is important that foaming be controlled and minimized.

DESCRIPTION OF THE PRIOR ART

One method and apparatus for controlling foaming in a dry-cleaning still is disclosed in Smith et al. Patent No. 3,011,956 granted Dec. 5, 1961, entitled, "Automatic Dry-Cleaning Still." In that patent, a light beam from a light source is directed across the upper part of the boil chamber and is received by a light-sensitive cell. When the solvent within the boil chamber foams up sufficiently to reach the beam of light, the light to the photo-cell is substantially reduced, and the change in the output from the photo-cell is used to shut off or reduce the steam to the coil in the boil chamber, whereby the foam blanket drops. When this occurs, the light to the photo-cell is re-established, and the steam to the coils is restored. The action is rapid, with heat being applied in a pulsating manner.

Another way of controlling foaming is to introduce a cold spray of solvent directed toward the surface of the liquid in the boil chamber, but this method tends to reduce greatly the distillation rate.

Other ways of controlling foaming have been attempted.

SUMMARY OF THE INVENTION

The system disclosed in the present application reduces foaming, without using the photo-cell system referred to above, or any other electrical or temperature-sensitive control arrangements, and without reducing the distillation rate. To the contrary, the maximum allowable distillation rate is greater than in prior art systems, yet the foaming is controlled.

In accordance with the present invention, two auxiliary open-top evaporator or boil pans are mounted, one above the other, both within the vapor zone of the main still above the liquid level of the main boil chamber. The dirty solvent which is to be cleaned is piped into the uppermost auxiliary boil pan where distillation of some of the solvent and water occurs. Liquid from the upper auxiliary boil pan discharges through a hole in the bottom of the pan and down through a length of pipe to the open-topped lower auxiliary boil pan, where further distillation of solvent and water occurs. Liquid from the lower auxiliary pan discharges through a hole in its bottom and down through a pipe to the main boil chamber. Each of the three pipes (through which the contaminated solvent is introduced to the upper auxiliary pan and through which liquid is passed to the lower boil pan and to the main boil chamber) is provided with a float-control valve. At start-up, the lower main boil chamber fills first to the float-control level. Then the lower auxiliary pan fills, and finally the upper auxiliary pan fills, each to its float-controlled level. When the still is operating at maximum production rate, all three boil vessels remain automatically filled to their float-controlled levels. Residue accumulates only in the main boil chamber. No residue collects in the auxiliary boil pans. The system permits a high distillation rate to be employed without encountering excessive foaming.

BRIEF DESCRIPTION OF THE DRAWING

The single figure of drawing is a diagrammatic representation of one preferred form of still utilizing the invention of the present application.

DESCRIPTION OF THE PREFERRED EMBODIMENT

Referring now to the single figure of drawing, reference numeral 5 identifies comprehensively the still, having a bottom plate 6, side walls 7 and a top plate 8 which is vented to atmosphere. The main boil chamber 10 is at the lower portion of the still. Reference numeral 18 identifies the liquid level in the main boil chamber 10, controlled by the float-control valve 19. The vapor zone extends from the liquid level 18 to the vapor level 29 just below the top plate 8.

Located in the upper right hand corner of the still, as viewed in the drawing, and at least partially within the vapor zone, is a condenser coil 20 having therebeneath a condensate collection pan 21 having an opening therein which discharges through a piping 22 to a water separator 23. Distilled solvent is collected from the separator 23 through the outlet 26.

Mounted in the main boil chamber 10 within the liquid zone is a steam coil 11 to which steam is applied through the steam input line 12. Steam condensate is discharged through the steam trap 14 and output piping 15. Also in the main boil chamber (but not shown in the drawing) is a usual type of sludge trap, which is periodically drained through the sludge drain 17.

In accordance with the present invention, at least one, and preferably at least two, supplementary or auxiliary open-topped evaporator or boil pans are mounted within the still in the vapor zone. Two such auxiliary boil pans 30 and 40 are shown in the drawing, mounted one above the other. Each of the auxiliary boil pans 30 and 40 is provided with a steam coil, 31 and 41 respectively, and supplied with steam from the common steam input line. Steam is applied to the upper coil 41 through the input line 42, and is applied to the lower coil 31 through the input line 32. Steam condensate is discharged through the steam traps 44 and 34, respectively, via the condensate output lines 45 and 35, and thence to the common output line 15.

Also, in accordance with the present invention, the contaminated solvent which is to be cleaned is introduced through the piping 51 into the upper boil pan 40. A flow control valve 49 is provided at the discharge end of the piping 51. Each of the auxiliary boil pans 40 and 30 is provided with a discharge opening in its bottom, identified by the reference numerals, 43 and 33, respectively, and discharge piping 47 and 37, respectively, extends downwardly from each of the discharge holes. In the case of the pan 40, the discharge piping 47 extends downwardly to the open-topped lower boil pan 30, and in the case of the lower boil pan 30, the discharge piping extends downwardly to the main boil chamber 10. Flow-control valves 39 and 19, respectively, are provided at the lower ends of the discharge pipings 47 and 37.

In operation, at start-up, the contaminated solvent flows through the upper and lower auxiliary boil pans into the main boil chamber 10 which fills first to the float-controlled level 18. When level 18 is reached, the float-control valve 19 closes and the lower auxiliary evaporator pan 30 begins to fill. When the liquid level in pan 30 reaches the float-controlled level 38, the float-control valve 39 closes and the upper auxiliary evaporator pan 40 begins to fill. When the liquid level in pan 40 reaches the float-controlled level 48, the float-control valve 49 closes, shutting off the introduction of additional contaminated solvent through piping 51 until the level in the upper boil pan 40 drops, at which time the float-control valve 49 opens to admit additional contaminated solvent.

During operation of the still at its maximum distillation rate, the levels in the main boil chamber 10 and in the lower and upper auxiliary pans 30 and 40 are automatically maintained. For it will be seen that as solvent and moisture are distilled from the main boil chamber 10, the liquid level 18 will drop, opening the float-control valve 19 and allowing additional liquid to drop into the main boil chamber 10 from the lower auxiliary pan 30. Such discharge of liquid from the lower pan 30, together with the loss of liquid from pan 30 through evaporation of solvent and water, causes the liquid level 38 to drop, opening the float-control valve 39 and allowing additional liquid to drop into the lower pan 30 from the upper pan 40. Similarly, discharge of liquid from upper pan 40 into lower pan 30, together with the loss of liquid from pan 40 through distillation of solvent and water, causes the liquid level 48 to drop, opening the float-control valve 49 and allowing additional contaminated solvent to be introduced into the system until the liquid levels in vessels 10, 30 and 40 rise to the float-control levels and again close the float-control valves.

The apparatus illustrated diagrammatically in the drawing and described above, allows distillation to take place at a high rate without encountering excessive or uncontrolled foaming. This has been proven by tests. The explanation of why distillation may be carried out at a rate which is high relative to that permitted by prior art apparatus, without encountering excessive or uncontrolled foaming, is believed to be as follows:

In the first place, substantially no residue collects in either of the auxiliary pans 30 or 40. Residue accumulates only in the main boil chamber 10. Thus, the liquids in the auxiliary pans 30 and 40 contain only that proportion of soils which were in the contaminated solvent at the time it is delivered to the still for distillation. The liquid in the main boil chamber 10, on the other hand, becomes more and more contaminated, and the proportion of soils becomes higher and higher, as the residue builds up. Since foaming is caused by the interaction or reaction between the soluble soaps and moisture, on the one hand, which are contained in the incoming contaminated solvent, and the fatty oils, etc., on the other hand, which are the residue, it will be seen that foaming will occur much more quickly and violently when the soiled solvent which is to be cleaned is introduced directly into the high residue liquid in the main boil chamber, than when it is introduced into a liquid having substantially no residue.

Thus, in accordance with the present invention, the interaction between the soluble soaps and water and the residual oils is substantially reduced by introducing the contaminated solvent first into auxiliary evaporator pans 40 and 30 to evaporate at least a substantial part of the moisture before the liquid reaches the main boil chamber.

Without intending to be limited to any specific values or rates of distillation, it may be said that apparatus such as is shown in the drawing and described above, has been operated at 40 p.s.i. at a distillation rate of between 60 and 90 gallons per minute without encountering excessive foaming. A small amount of foaming may occur in the evaporator pans 40 and 30, but the foam merely drops down into the main boil chamber 10, without causing further foaming. The continued addition of such foam to the main boil chamber 10 may, in some instances at least, cause the liquid level to rise above the float-control level. In some installations, therefore, it may be deemed necessary to install a separate level control, represented in the drawing by the reference numeral 60. This additional level control may be mounted on the wall of the still above the float-controlled level 18, and so connected as to shut off the still when the level of the liquid in the main boil chamber 10 reaches the level of control 60.

It will be seen from the foregoing description and from the illustrated embodiment that the present invention provides an improved method and an apparatus for distillation of solvents without causing excessive foaming. At least one auxiliary evaporation pan, and preferably two in series, one above the other, are used to dissipate at least a substantial portion of the foaming agents before they reach the main boil chamber. As the residue builds up in the main boil chamber, the rate of distillation therefrom decreases, but the rate of distillation from the evaporator pan or pans remains substantially constant since no residue is trapped therein. The heated auxiliary evaporator pans also function as foam breakers or barriers, tending to prevent any foam from the main boil chamber from rising thereabove.

While the preferred embodiment of this invention has been described in some detail, it will be obvious to one skilled in the art that various modifications may be made without departing from the invention as hereinafter claimed.

What is claimed is:

1. Apparatus for reclaiming volatile solvent from contaminated solvent containing moisture, said apparatus comprising:
   (a) a still having side walls;
   (b) a main boil chamber and a vapor zone thereabove within the side walls of said still;
   (c) at least one evaporator pan mounted in the vapor zone above said main boil chamber,
   (d) said evaporator pan having separate side walls of sufficient height to allow for accumulation in said pan of a substantial depth of liquid;
   (e) means for introducing contaminated volatile solvent liquid containing moisture into said evaporator pan;
   (f) first heating means for heating the liquid in said evaporator pan for evaporating at least moisture therefrom;
   (g) drain means in the lower part of said evaporator pan and in communication with said main boil chamber for allowing discharge of liquid from said evaporator pan into said main boil chamber;
   (h) second heating means for heating the liquid in said main boil chamber for evaporating solvent;
   (i) first valve means operatively positioned on said means for introducing liquid for preventing said contaminated solvent liquid from overflowing the sidewalls of said evaporator pan, said first valve means operatively responsive to liquid level sensing means for automatically closing said introducing means when the liquid in the evaporator pan rises to a predetermined level;
   (j) second valve means operatively positioned on said drain means and operatively responsive to the liquid level in the main boil chamber for automatically closing said communicating drain means when the liquid in the main boil chamber rises to a predetermined level; and
   (k) means connected to the upper part of said vapor zone for condensing vaporized solvent and collecting the condensate.

2. Apparatus for reclaiming volatile solvent from contaminated solvent containing moisture, said apparatus comprising:
   (a) a still having side walls;
   (b) a main boil chamber and a vapor zone thereabove within the side walls of said still;
   (c) at least one evaporator pan mounted in the vapor zone above said main boil chamber;
   (d) said evaporator pan having separate side walls of sufficient height to allow for accumulation in said pan of a substantial depth of liquid;
   (e) means for introducing contaminated volatile solvent liquid containing moisture into said evaporator pan;
   (f) first heating means for heating the liquid in said evaporator pan for evaporating at least moisture therefrom;
   (g) drain means in the lower part of said evaporator pan and in communication with said main boil chamber for allowing discharge of liquid from said evaporator pan into said main boil chamber;
   (h) second heating means for heating the liquid in said main boil chamber for evaporating solvent;
   (i) first liquid-level control means for preventing said contaminated solvent liquid from overflowing the sidewalls of said evaporator pan, said first liquid-level control means automatically closing said introducing means when the liquid in the evaporator pan rises to a predetermined level;
   (j) second liquid-level control means for automatically closing said communicating drain means when the liquid in the main boil chamber rises to a predetermined level;
   (k) condenser means within said side walls of said still for condensing vaporized solvent and collecting the condensate; and
   (l) third liquid-level control means mounted on the side wall of said still above the level of said second liquid level for shutting down the still when the liquid level in the main boil chamber reaches said third liquid-level control means.

3. The method of separating volatile chlorinated hydrocarbons from liquid mixtures which also contain moisture and contaminants which tend to emulsify and foam during distillation, said method comprising the steps of:
   (a) supplying the liquid mixture to a first upper level to form a pool thereof of substantial depth,
   (b) subjecting the pool of liquid mixture at said first upper level to heat for causing evaporation of at least moisture therefrom,
   (c) discharging the heated liquid mixture, from which moisture has been removed, from the lower portion of said pool to a second pool located at a level below the first, said second pool also having substantial depth;
   (d) subjecting the liquid mixture in said second pool to further heat to evaporate volatile chlorinated hydrocarbons therefrom, and
   (e) condensing the vaporized solvent and collecting the condensate.

4. Apparatus for reclaiming volatile solvent from contaminated solvent containing moisture, said apparatus comprising:
   (a) a still having side walls;
   (b) a main boil chamber and a vapor zone thereabove within the side walls of said still;
   (c) at least one evaporator pan mounted in the vapor zone above said main boil chamber,
   (d) said evaporator pan having separate side walls of sufficient height to allow for accumulation in said pan of a substantial depth of liquid;
   (e) means for introducing contaminated volatile solvent liquid containing moisture into said evaporator pan;
   (f) first heating means for heating the liquid in said evaporator pan for evaporating at least moisture therefrom;
   (g) drain means in the lower part of said evaporator pan and in communication with said main boil chamber for allowing discharge of liquid from said evaporator pan into said main boil chamber;
   (h) second heating means for heating the liquid in said main boil chamber for evaporating solvent;
   (i) first valve means operatively positioned on said means for introducing liquid for controlling the flow of said contaminated solvent liquid into said evaporator pan to prevent overflowing the sidewalls thereof,
   (j) second valve means operatively positioned on said drain means for automatically closing said communicating drain means when the liquid in the main boil chamber rises to a predetermined level; and
   (k) means connected to the upper part of said vapor zone for condensing vaporized solvent and collecting the condensate.

5. Apparatus for reclaiming volatile solvent from contaminated solvent containing moisture, said apparatus comprising:
   (a) a still having side walls;

(b) a main boil chamber and a vapor zone thereabove within the side walls of said still;

(c) at least one evaporator pan mounted in the vapor zone above said main boil chamber;

(d) said evaporator pan having separate side walls of sufficient height to allow for accumulation in said pan of a substantial depth of liquid;

(e) means for introducing contaminated volatile solvent liquid containing moisture into said evaporator pan;

(f) first heating means for heating the liquid in said evaporator pan for evaporating at least moisture therefrom;

(g) drain means in the lower part of said evaporator pan and in communication with said main boil chamber for allowing discharge of liquid from said evaporator pan into said main boil chamber;

(h) second heating means for heating the liquid in said main boil chamber for evaporating solvent;

(i) first control means for controlling the flow of said contaminated solvent into said evaporator pan for preventing said contaminated solvent liquid from overflowing the sidewalls thereof, (j) second control means for automatically closing said communicating drain means when the liquid in the main boil chamber rises to a predetermined level;

(k) condenser means within said side walls of said still for condensing vaporized solvent and collecting the condensate; and (l) third control means mounted in said still above the level of said second liquid level for indicating when the still should be shut down.

References Cited

UNITED STATES PATENTS

| | | | |
|---|---|---|---|
| 1,401,116 | 12/1921 | Ehrhart | 202—173 |
| 1,782,959 | 11/1930 | Elliott | 202—173 |
| 2,152,665 | 4/1939 | Rosenthal | 202—173 |
| 2,289,956 | 7/1942 | Gans et al. | 202—181 |
| 2,578,670 | 12/1951 | Carleton. | |
| 2,832,726 | 4/1958 | Norment | 202—181 |
| 3,011,956 | 12/1961 | Smith et al. | 202—160 |
| 3,020,214 | 2/1962 | Beduhn et al. | 203—1 |
| 3,027,307 | 3/1962 | Stoffer et al. | 203—1 |
| 3,053,521 | 9/1962 | Plaster et al. | 202—158 |
| 3,322,136 | 5/1967 | Matta | 202—181 |

WILBUR L. BASCOMB, Jr., *Primary Examiner.*

U.S. Cl. X.R.

202—160, 173, 181; 203—1, 14, 71